(12) United States Patent
Grussing et al.

(10) Patent No.: US 9,375,701 B2
(45) Date of Patent: Jun. 28, 2016

(54) WASTE PAINT SOLIDIFIER

(71) Applicant: United States Gypsum Company, Chicago, IL (US)

(72) Inventors: Jeffrey F. Grussing, Trevor, WI (US); Nancy L. Bernicke-Grussing, Trevor, WI (US)

(73) Assignee: UNITED STATES GYPSUM CORPORATION, Chicago, IL (US)

( * ) Notice: Subject to any disclaimer, the term of this patent is extended or adjusted under 35 U.S.C. 154(b) by 44 days.

(21) Appl. No.: 14/294,341

(22) Filed: Jun. 3, 2014

(65) Prior Publication Data

US 2015/0343419 A1    Dec. 3, 2015

(51) Int. Cl.

| | |
|---|---|
| *B01J 20/22* | (2006.01) |
| *B01J 20/24* | (2006.01) |
| *B01J 20/12* | (2006.01) |
| *B01J 20/10* | (2006.01) |
| *B09B 3/00* | (2006.01) |
| *A63D 3/00* | (2006.01) |
| *B01D 21/01* | (2006.01) |
| *C02F 1/52* | (2006.01) |
| *C09D 7/00* | (2006.01) |
| *C08L 1/28* | (2006.01) |
| *C08K 3/34* | (2006.01) |
| *C02F 11/14* | (2006.01) |
| *C02F 103/14* | (2006.01) |

(52) U.S. Cl.
CPC . *B01J 20/24* (2013.01); *A63D 3/00* (2013.01); *B01D 21/01* (2013.01); *B01J 20/103* (2013.01); *B01J 20/12* (2013.01); *B09B 3/00* (2013.01); *B09B 3/0008* (2013.01); *B09B 3/0033* (2013.01); *C02F 1/52* (2013.01); *C08K 3/346* (2013.01); *C08L 1/286* (2013.01); *C09D 7/002* (2013.01); *C02F 11/14* (2013.01); *C02F 2103/14* (2013.01)

(58) Field of Classification Search
CPC .......................................................... B01J 20/22
USPC .......................................................... 502/404
See application file for complete search history.

(56) References Cited

U.S. PATENT DOCUMENTS

| | | |
|---|---|---|
| 4,415,683 A | 11/1983 | Kernstock |
| 4,464,524 A | 8/1984 | Karickhoff |
| 5,492,881 A | 2/1996 | Diamond |
| 5,496,404 A | 3/1996 | Price et al. |
| 5,550,314 A | 8/1996 | Laughlin et al. |
| 5,789,493 A | 8/1998 | Van Aaken et al. |
| 6,084,009 A | 7/2000 | Mizoguchi et al. |
| 6,162,164 A | 12/2000 | Lorraine et al. |
| 8,071,685 B2 | 12/2011 | Nosker et al. |
| 8,324,144 B2 | 12/2012 | Hawes et al. |
| 2002/0147378 A1 | 10/2002 | Atkins et al. |
| 2010/0075826 A1 | 3/2010 | Tang et al. |
| 2012/0073470 A1 | 3/2012 | Such et al. |
| 2012/0220810 A1 | 8/2012 | Forrester |

FOREIGN PATENT DOCUMENTS

| | | |
|---|---|---|
| CN | 103184694 | 7/2013 |
| WO | WO 2009/006678 | 1/2009 |

*Primary Examiner* — Edward Johnson
(74) *Attorney, Agent, or Firm* — Greer, Burns & Crain, Ltd.; Pradip Sahu; Philip T. Petti

(57) ABSTRACT

Compositions with sodium carboxymethylcellulose and hydroxyethyl cellulose are provided for environmentally safe disposal of water-based latex and acrylic formulations. Improved methods for environmentally safe disposal of water-based latex and acrylic formulations are provided as well.

17 Claims, 3 Drawing Sheets

WASTE PAINT SOLIDIFIER

BACKGROUND

This invention provides waste paint solidifying compositions and methods for environmentally-friendly paint disposal. The waste paint solidifying compositions are fast-acting and comprise sodium carboxymethylcellulose as a chemical thickener to solidify latex or acrylic paint. The compositions can be used to treat water-based waste streams such as paints, textures, joint compounds, and coatings for disposal in accordance with applicable environmental and government regulations. Methods for non-toxic disposal of latex or acrylic paint are provided as well.

Extrapolating data from several states, the U.S. Environmental Protection Agency (EPA) calculates that between 35 and 103 million gallons of paint are disposed of each year. While the EPA does not classify latex paint as hazardous waste, most waste disposal facilities will not accept paint of any kind unless the paint is completely solidified. Liquid latex paint can cause huge cleanup problems such as contamination of ground water or when cans with liquid paint are crushed during transportation to a landfield and the paint leaks out onto roadways.

Construction industry utilizes liquid latex and acrylic paints and various water-based latex and acrylic products such as, for example, as water-based coatings, primers, textures and joint compounds. However, these products may not be disposed of as liquids. One solution for proper disposal is to solidify waste paints by adding an absorbent material.

Many commercially available solidifiers use sodium polyacrylate crystals to dispose of water-based paints and colorants. For example, US patent publication 2002/0147378 discloses the use of a swellable polyacrylate to solidify liquid paints. Other known paint solidifiers use pelletized corn cobs, or absorbents like clay, sand, or vermiculite and include solidifiers disclosed in US patent publication 2012/0073470. However, many of these solidifiers take several hours to absorb a liquid paint and some solidifiers need to be used in large amounts, which increases dramatically the amount of waste generated. Thus, there remains the need for non-toxic paint solidifiers which can solidify expeditiously acrylic and latex liquid paints without increasing significantly the amount of solid waste generated in the process.

SUMMARY

At least some of these needs are addressed by compositions and methods of the present invention. One embodiment provides a waste paint solidifying composition formulated with sodium carboxymethylcellulose and hydroxyethyl cellulose. The waste paint solidifying composition may further comprise cellulosic fibers, an absorbent or a combination thereof. Various cellulosic fibers are suitable including, but not limited to, straw, rice hulks, wood chips, corn cobs or any combination thereof.

In some embodiments, an absorbent may be sand, attapulgite clay and vermiculite clay. Suitable waste paint solidifying compositions include those with 30-50% sodium carboxymethylcellulose, 10-30% hydroxyethyl cellulose, 10-30% cellulosic fibers and 10-30% attapulgite clay.

Further embodiments provide methods for environmentally safe disposal of waste water-based paint products in which the waste products are mixed with a waste paint solidifying composition comprising sodium carboxymethylcellulose and hydroxyethyl cellulose. These methods are useful for disposing of various waste water-based paint products including, but not limited to, water-based latex paints, polyacrylic paints, joint compounds and coatings.

DETAILED DESCRIPTION

Figure 1A:
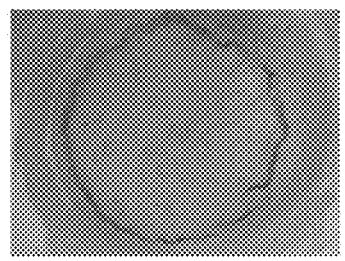
FIGS. 1A, 1B and 1C depict solidification of a latex paint as described in Table 1.

The present invention provides waste paint solidifying compositions comprising at least one cellulosic thickener. These waste paint solidifying compositions are suitable for solidifying water-based waste latex paint, acrylic paint, stains, primers, coatings, texture, joint compounds and other non-hazardous water-based products to a non-flowable, gel-like consistency. The waste paint solidifying compositions provide an environmentally acceptable way for disposing of unwanted liquid paint products by curbside garbage disposal in accordance with municipal landfill regulations.

One embodiment provides a waste paint solidifying composition which comprises a combination of sodium carboxymethylcellulose and hydroxyethyl cellulose. At least in some embodiments, a waste paint solidifying composition comprises 30-50% of sodium carboxymethylcellulose. At least in some embodiments, a waste paint solidifying composition comprises 10-30% of hydroxyethyl cellulose. At least in some embodiments, a waste paint solidifying composition comprises 30-50% of sodium carboxymethylcellulose and 10-30% of hydroxyethyl cellulose. Some waste paint solidifying compositions comprise about 40% of sodium carboxymethylcellulose and about 20% of hydroxyethyl cellulose.

In addition to sodium carboxymethylcellulose and hydroxyethyl cellulose, some waste paint solidifying compositions may comprise cellulosic fibers. At least in some embodiments, waste paint solidifying compositions comprise 10-30% cellulosic fibers. In some embodiments, waste paint solidifying compositions comprise 20% cellulosic fibers. Various cellulosic fibers can be used, including, but not limited to, straw, rice hulks, wood chips and corn cobs.

Waste paint solidifying compositions may further comprise an absorbent. Suitable absorbents include, but are not limited to, clay, sand, attapulgite clay and vermiculite clay. In some embodiments, a waste paint solidifying composition may comprise 10-30% of an absorbent. In further embodiments, a waste paint solidifying composition may comprise 20% of an absorbent. Some waste paint solidifying compositions comprise 20% attapulgite clay.

Some waste paint solidifying compositions comprise sodium carboxymethylcellulose, hydroxyethyl cellulose, cellulosic fibers and attapulgite clay. Some waste paint solidifying compositions comprise 30-50% sodium carboxymethylcellulose, 10-30% hydroxyethyl cellulose, 10-30% cellulosic fibers and 10-30% attapulgite clay. Some waste paint solidifying compositions comprise 40% sodium carboxymethylcellulose, 20% hydroxyethyl cellulose, 20% cellulosic fibers and 20% attapulgite clay.

Waste paint solidifying compositions can be prepared by using various methods known to a person of skill, including by dry blending sodium carboxymethylcellulose and hydroxyethyl cellulose thickeners with at least one absorbent filler such as cellulosic fibers and attapulgite clay.

In order to gel-solidify acrylic or latex liquid waste substance, a waste paint solidifying composition is added to the substance, stirred or drill mixed with the substance and the mixture is allowed to hydrate to a solidified state. Typically, a waste paint solidifying composition can be added in the amount from 1% to 5% by weight of acrylic or latex liquid to be solidified. In some embodiments, a waste paint solidifying composition can be added in the amount from 1% to 10% by weight of acrylic or latex liquid to be solidified.

In some embodiments, a waste paint solidifying composition comprising 30-50% of sodium carboxymethylcellulose and 10-30% hydroxyethyl cellulose is added in the amount from 1% to 5% by weight of acrylic or latex liquid to be solidified. In some embodiments, a waste paint solidifying composition comprising 30-50% of sodium carboxymethylcellulose, 10-30% hydroxyethyl cellulose, 10-30% cellulosic fibers and 10-30% attapulgite clay, is added in the amount from 1% to 5% by weight of acrylic or latex liquid to be solidified. In some embodiments, a waste paint solidifying composition comprising 30-50% of sodium carboxymethylcellulose and 10-30% hydroxyethyl cellulose is added in the amount from 1% to 5% by weight of acrylic or latex liquid to be solidified. In some embodiments, a waste paint solidifying composition comprising 30-50% of sodium carboxymethylcellulose, 10-30% hydroxyethyl cellulose, 10-30% cellulosic fibers and 10-30% attapulgite clay, is added in the amount from 1% to 10% by weight of acrylic or latex liquid to be solidified.

The inventors have unexpectedly discovered that a waste paint solidifying composition comprising sodium carboxymethylcellulose and hydroxyethyl cellulose thickeners is highly efficient in gel solidifying acryl and latex aqueous products. The waste paint solidifying composition solidifies various latex and acrylic waste streams when used in the amount of as little as 1%-3% by weight of waste liquid to be solidified. Further and also unexpectedly, a waste paint solidifying composition is fast acting and changes consistency of acrylic or latex liquid from liquid to non-flowable gel in a short to period time ranging from several seconds to 10 minutes. A non-toxic formulation of the waste paint solidifying composition and its ability to solidify a waste paint product rapidly provide a significant improvement over commercially available waste solidifying products comprising a polyacrylate or corn cobs.

A gel-solidifying reaction with the present waste paint solidifying composition is irreversible and gel-solidified waste paint does not convert back to a fluid state even after it comes in contact with water or other liquid at a landfill.

Further embodiments provide methods in which water-based latex or acrylic products are gel solidified in a period of time less than one hour by using a waste paint solidifying composition comprising sodium carboxymethylcellulose and hydroxyethyl cellulose thickeners.

Figure 1B:
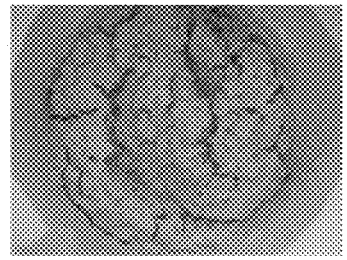
Figure 1C:
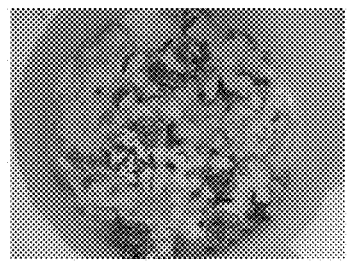
Figure 2A:
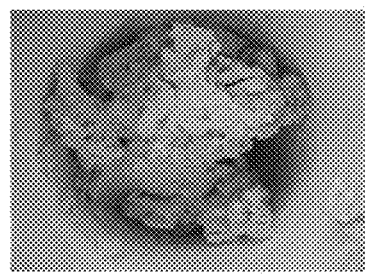
FIGS. 2A, 2B, 2C and 2D depict solidification of SHEETROCK® MH Speed-Tex Ready™ mixed spray texture as described in Table 2.
Figure 2B:
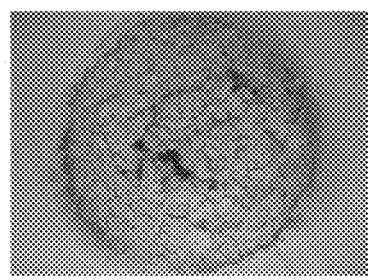
Figure 2C:
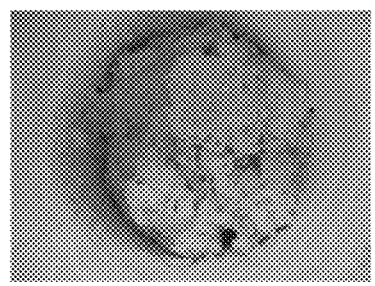
Figure 2D:
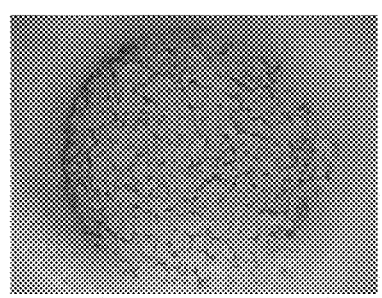
Figure 3A:
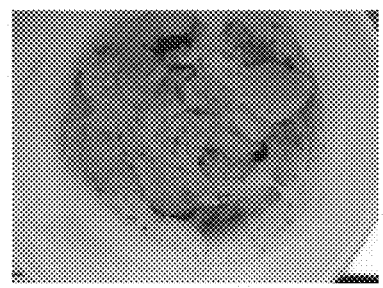
FIGS. 3A, 3B, 3C and 3D depict solidification of SHEETROCK® wall & ceiling spray texture, sand finish texture 12 as described in Table 3.
Figure 3B:
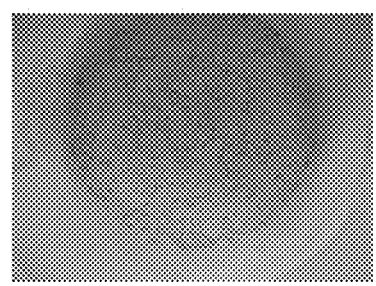
Figure 3C:
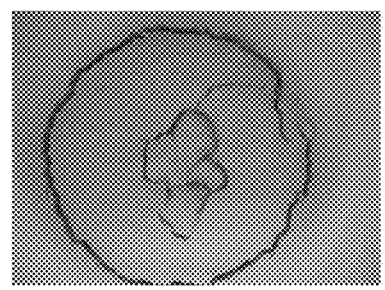
Figure 3D:
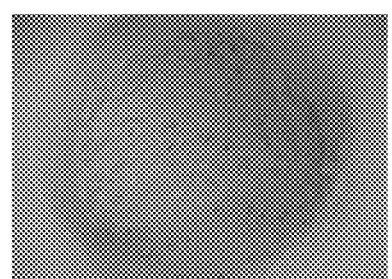

As shown in Table 1 and corresponding FIGS. 1A-1C, waste water-based latex paint is gel-solidified with a waste paint solidifying composition in a matter of 10 minutes when a waste paint solidifying composition comprising 40% sodium carboxymethylcellulose, 20% hydroxyethyl cellulose, 20% cellulosic fibers and 20% attapulgite clay, is added to the final concentration of 3% by weight of waste latex paint.

In comparison, a commercially available polyacrylate-based solidifier gel-solidifies the same amount of latex paint only in about 25 minutes. Compare Table 1, column 1 with column 2 and also FIG. 1A with FIG. 1B. A commercially available corncob-based solidifier gel-solidifies the same amount of latex paint in more than 4 hours and it has to be used in a much larger amount (13.51%). Compare column 1 with column 3 in Table 1 and also FIG. 1A with FIG. 1C.

TABLE 1

Comparative Gel-Solidification of Waste Latex Paint

|  | 1 | 2 | 3 |
|---|---|---|---|
| Amount of Latex Water-Based Paint with density 10.65 lb/gallon | 500 grams | 500 grams | 500 grams |
| Waste Paint Solidifier | Sodium Carboxymethylcellulose; Hydroxyethyl Cellulose Cellulosic Fibers Attapulgite Clay | Commercial polyacrylate-based solidifier | Commercial corncob-based solidifier |
| Amount of Solidifier | 15 grams | 15 grams | 67.55 grams |
| Percent by Weight | 3% | 3% | 13.51% |
| Hand Mix Time | 2 minutes | 2 minutes | 2 minutes |
| Gel Time | 10 minutes | 25 minutes | +4 hours |
| FIG. | FIG. 1A | FIG. 1B | FIG. 1C |

As shown in Table 2 and corresponding FIGS. 2A-2D, a waste paint solidifying composition comprising sodium carboxymethylcellulose, hydroxyethyl cellulose, cellulosic fibers and attapulgite clay is also more efficient in solidifying aqueous acrylic formulation SHEETROCK® Brand MH SPEED-TEX™ Ready-Mixed Spray Texture (United States Gypsum Company, Illinois).

Specifically, a waste paint solidifying composition comprising 40% sodium carboxymethylcellulose, 20% hydroxyethyl cellulose, 20% cellulosic fibers and 20% attapulgite clay gel-solidified the texture in 30 seconds when used at 2% by weight of the texture and in 1 minute when used at 1%. Compare columns 1 and 3 in Table 2 and FIGS. 2A and 2C. A commercially available polyacrylate-based solidifier is less efficient and gel-solidifies the same amount of SPEED-TEX™ in 2 minutes when used at 2% and in 7 minutes when used at 1%. Compare column 1 with column 2 in Table 2 and column 3 with column 4 in Table 2; also compare FIG. 2A with FIG. 2B and FIG. 2C with FIG. 2D.

TABLE 2

Comparative Gel-Solidification of SPEED-TEX ™

|  | 1 | 2 | 3 | 4 |
|---|---|---|---|---|
| Amount of Speed-Tex | 500 grams | 500 grams | 500 grams | 500 grams |
| Waste Paint Solidifier | Sodium Carboxymethyl cellulose; Hydroxyethyl | Commercial polyacrylate- | Sodium Carboxymethyl cellulose; Hydroxyethyl | Commercial polyacrylate- |

TABLE 2-continued

Comparative Gel-Solidification of SPEED-TEX ™

| | 1 | 2 | 3 | 4 |
|---|---|---|---|---|
| | Cellulose; Cellulosic Fibers; Attapulgite Clay | based solidifier | Cellulose; Cellulosic Fibers; Attapulgite Clay | based solidifier |
| Amount of Solidifier | 10 grams | 10 grams | 5 grams | 5 grams |
| Percent by Weight | 2% | 2% | 1% | 1% |
| Mix Time | 20 seconds | 2 minutes | 45 seconds | 2 minutes |
| Gel Time | 30 seconds | 5 minutes | 1 minute | 7 minutes |
| FIG. | FIG. 2A | FIG. 2B | FIG. 2C | FIG. 2D |

As shown in Table 3 and corresponding FIGS. 3A-3D, a waste paint solidifying composition comprising sodium carboxymethylcellulose, hydroxyethyl cellulose, cellulosic fibers and attapulgite clay is also efficient in solidifying aqueous acrylic formulation SHEETROCK® Wall & Ceiling Spray Texture, sand finish texture 12 (United States Gypsum Company, Illinois).

Specifically, a waste paint solidifying composition comprising 30% sodium carboxymethylcellulose, 40% hydroxyethyl cellulose, 20% cellulosic fibers and 20% attapulgite clay gel-solidifies the texture in 1 minute when used at 2% by weight of the texture and in 2 minutes when used at 1% by weight of the texture. Compare Table 3, columns 1 and 3 and FIGS. 3A and 3C. In comparison, a commercially available polyacrylate-based solidifier gel-solidifies the same amount of Texture XII in 4 minutes when used at 2% by weight of the texture and in 11 minutes when used at 1% by weight of the texture.

TABLE 3

Comparative Gel-Solidification of Texture XII

| | 1 | 2 | 3 | 4 |
|---|---|---|---|---|
| Amount of Texture XII | 500 grams | 500 grams | 500 grams | 500 grams |
| Waste Paint Solidifier | Sodium Carboxymethyl cellulose; Hydroxyethyl Cellulose; Cellulosic Fibers; Attapulgite Clay | Commercial polyacrylate-based solidifier | Sodium Carboxymethyl cellulose; Hydroxyethyl Cellulose; Cellulosic Fibers; Attapulgite Clay | Commercial polyacrylate-based solidifier |
| Amount of Solidifier | 10 grams | 10 grams | 5 grams | 5 grams |
| Percent by Weight | 2% | 2% | 1% | 1% |
| Mix Time | 45 seconds | 2 minutes | 45 seconds | 2 minutes |
| Gel Time | 1 minute | 4 minutes | 2 minutes | 11 minutes |
| FIG. | FIG. 3A | FIG. 3B | FIG. 3C | FIG. 3D |

As shown in Tables 1, 2 and 3, a waste paint solidifying composition comprising sodium carboxymethylcellulose, hydroxyethyl cellulose, cellulosic fibers and attapulgite clay gel solidifies water-based latex and acrylic waste products in a matter of minutes. The reaction is irreversible and once solidified, the waste products can be safely disposed of. Only a small amount of the waste paint solidifying composition, typically less than 10%, is needed to gel solidify the waste product. Thus, this gel solidification method does not increase significantly the total volume of waste.

EXAMPLE 1

A waste paint solidifying composition was prepared by mixing together the following:

| | |
|---|---|
| Sodium Carboxymethylcellulose | 40% |
| Hydroxyethyl Cellulose | 20% |
| Cellulosic Fibers | 20% |
| Attapulgite Clay | 20% |

All percentages are by weight.

EXAMPLE 2

The waste paint solidifying composition of Example 1 was used to solidify a water-based latex paint as shown in Table 1 and FIGS. 1A, 1B and 1C. The waste paint solidifying composition of Example 1 was also used to solidify an aqueous acrylic product as shown in Table 2 and FIGS. 2A, 2B, 2C and 2D and in Table 3 and FIGS. 3A, 3B, 3C and 3D.

In all tests, the waste paint solidifying composition was stirred into the waste liquids by hand using a spatula. Gel time was measured as the amount of time required for developing a sufficient level of viscosity needed to prevent the waste material from falling out of the quart cup when completely inverted. Gel time was measured from the start of the test when the waste paint solidifying composition was introduced into the waste stream.

While particular embodiments of the waste paint solidifying composition and methods of using the composition have been shown and described, it will be appreciated by those skilled in the art that changes and modifications may be made thereto without departing from the invention in its broader aspects and as set forth in the following claims.

What is claimed is:

1. A waste paint solidifying composition, the composition comprising sodium carboxymethylcellulose and hydroxyethyl cellulose.

2. The composition of claim 1 which further comprises cellulosic fibers, an absorbent or a combination thereof.

3. The composition of claim 1, wherein the composition comprises 30-50% sodium carboxymethylcellulose and 10-30% hydroxyethyl cellulose.

4. The composition of claim 2, wherein the cellulosic fibers are selected from the group consisting of straw, rice hulks, wood chips, corn cobs and any combination thereof.

5. The composition of claim 2, wherein the absorbent is selected from the group consisting of sand, attapulgite clay and vermiculite clay.

6. The composition of claim 1, wherein the composition further comprises cellulosic fibers and attapulgite clay.

7. The composition of claim 6, wherein the cellulosic fibers are used in the amount from 10% to 30%.

8. The composition of claim 6, wherein the attapulgite clay is used in the amount from 10% to 30%.

9. The composition of claim 1, wherein the composition comprises 40% sodium carboxymethylcellulose and 20% hydroxyethyl cellulose.

10. A method for disposing of a water-based paint product, the method comprising:
    mixing the water-based paint product with a waste paint solidifying composition comprising sodium carboxymethylcellulose and hydroxyethyl cellulose; and
    allowing the mixture to absorb and gel-solidify the water-based paint product.

11. The method of claim 10, wherein the water-based paint product is selected from the group consisting of latex paint products, polyacrylic paint products and combinations therefore.

12. The method of claim 10, wherein the water-based pant product is selected from the group consisting of joint compounds, latex paints, polyacrylic paints, latex coatings, polyacrylic coatings and textures.

13. The method of claim 10, wherein the step of absorbing and gel-solidifying is performed in less than 1 hour.

14. The method of claim 10, wherein the waste paint solidifying composition is used in the amount 1-10% by weight of the water-based paint product.

15. The method of claim 10, wherein the waste paint solidifying composition comprises 30-50% sodium carboxymethylcellulose and 10-30% hydroxyethyl cellulose.

16. The method of claim 10, wherein the waste paint solidifying composition further comprises cellulosic fibers and attapulgite clay.

17. The method of claim 16, wherein the cellulosic fibers are used in the amount from 10% to 30% and the attapulgite clay is used in the amount from 10% to 30%.

\* \* \* \* \*